(12) United States Patent
Latiri

(10) Patent No.: US 6,765,156 B2
(45) Date of Patent: Jul. 20, 2004

(54) GOLF CLUB SWING WEIGHT BALANCE AND SCALE

(75) Inventor: Mondher Latiri, Kaohsiung (TW)

(73) Assignee: Technorama Co., Ltd., Feng Shan (TW)

(*) Notice: Subject to any disclaimer, the term of this patent is extended or adjusted under 35 U.S.C. 154(b) by 105 days.

(21) Appl. No.: 10/247,315

(22) Filed: Sep. 20, 2002

(65) Prior Publication Data

US 2004/0055791 A1 Mar. 25, 2004

(51) Int. Cl.$^7$ ............................. A63B 53/00; G01G 1/18
(52) U.S. Cl. ........................ 177/171; 177/191; 177/246; 177/253; 73/65.03; 473/291
(58) Field of Search ........................ 73/65.03; 177/171, 177/191, 246, 253, 264; 473/131, 282, 291

(56) References Cited

U.S. PATENT DOCUMENTS

| | | | | |
|---|---|---|---|---|
| 1,953,916 A | * | 4/1934 | Adams | 73/65.03 |
| 2,108,877 A | * | 2/1938 | Wettlaufer | 73/65.03 |
| 2,595,717 A | * | 5/1952 | Kenneth | 73/65.03 |
| 3,577,771 A | * | 5/1971 | Solheim | 73/65.03 |
| 4,106,220 A | * | 8/1978 | Hurd | 434/194 |
| 4,347,905 A | * | 9/1982 | Berckes | 177/149 |
| 5,285,680 A | * | 2/1994 | Sun | 73/65.03 |
| 5,367,129 A | * | 11/1994 | Lahl, Jr. | 177/229 |
| 5,417,108 A | * | 5/1995 | Chastonay | 73/65.03 |
| 5,814,773 A | * | 9/1998 | Latiri | 177/171 |

OTHER PUBLICATIONS

"Golfworks Economy Swingweight Scale", Webpage advertisement, http://www.golfworks.com (Sep. 19, 2002).
"Dynacraft Swingweight Scale", Webpage advertisement, http://www.dynacraftgolf.com (Sep. 19, 2000).
"Description of swingweight showing golfsmith swingweight scale equip2golf", Webpage advertisement, http://www.equip2golf.com (Sep. 19, 2002).

* cited by examiner

Primary Examiner—Randy W. Gibson
(74) Attorney, Agent, or Firm—Leydig, Voit & Mayer, Ltd.

(57) ABSTRACT

A golf club swing weight balance and scale according to the invention includes a weighing beam having and extending between first and second ends, a grip backstop disposed at the second end of the weighing beam and including a grip cap compensator movable within the grip backstop between an extended position and a retracted position, a slide weight slideably mounted on the weighing beam, and a pivot assembly pivotally supporting the weighing beam at a location intermediate the first and second ends and including a single support member disposed on only one side of the weighing beam so that the slide weight can be moved from the first end to the second end in a single stroke. The pivot assembly preferably includes a knife edge fulcrum, one end of which includes a knife edge pivotally connected to the weighing beam. The slide weight indicator includes a balance indicator indicating when the weighing beam is balanced, most preferably a bubble level mounted on the slide weight. The head of the grip cap compensator is substantially co-planar with a grip contact surface of the grip backstop when the grip cap compensator is in the retracted position and protrudes from the grip cap contact surface of the grip backstop by a distance substantially equal to the thickness of the end of a grip so that swing weight can be accurately determined regardless of whether a golf club includes a grip.

14 Claims, 12 Drawing Sheets

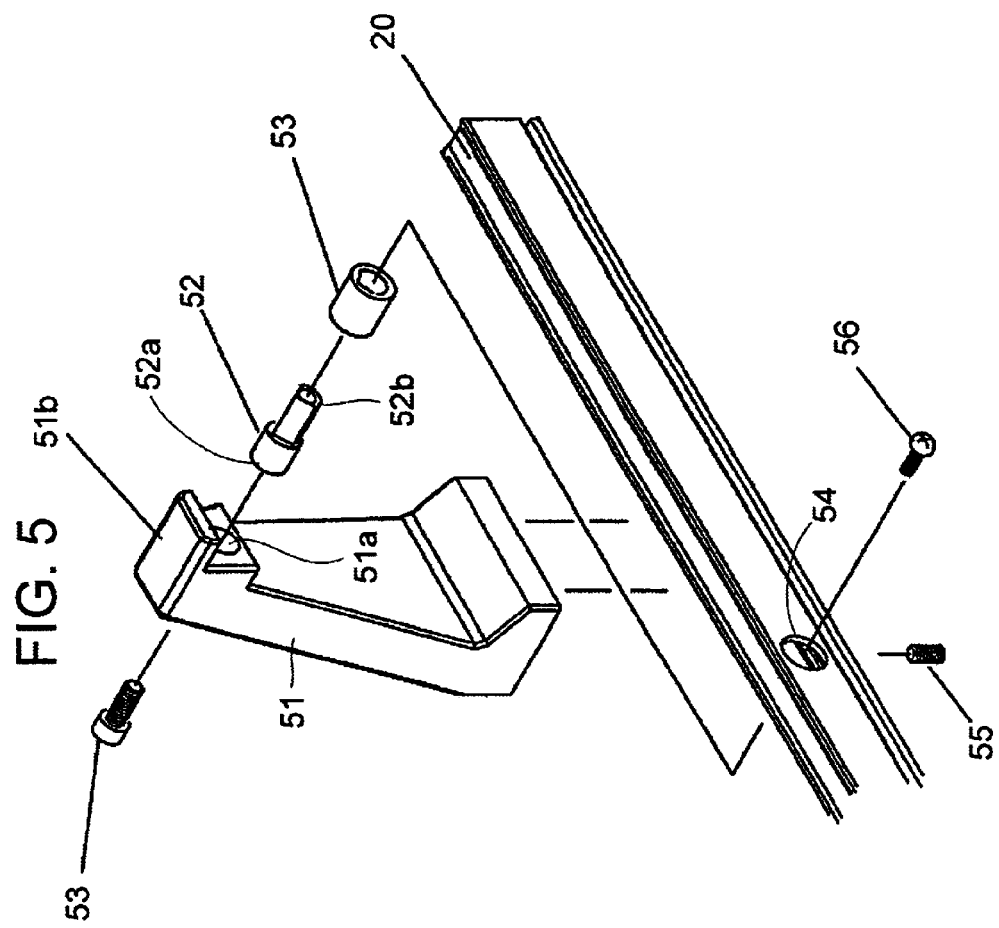

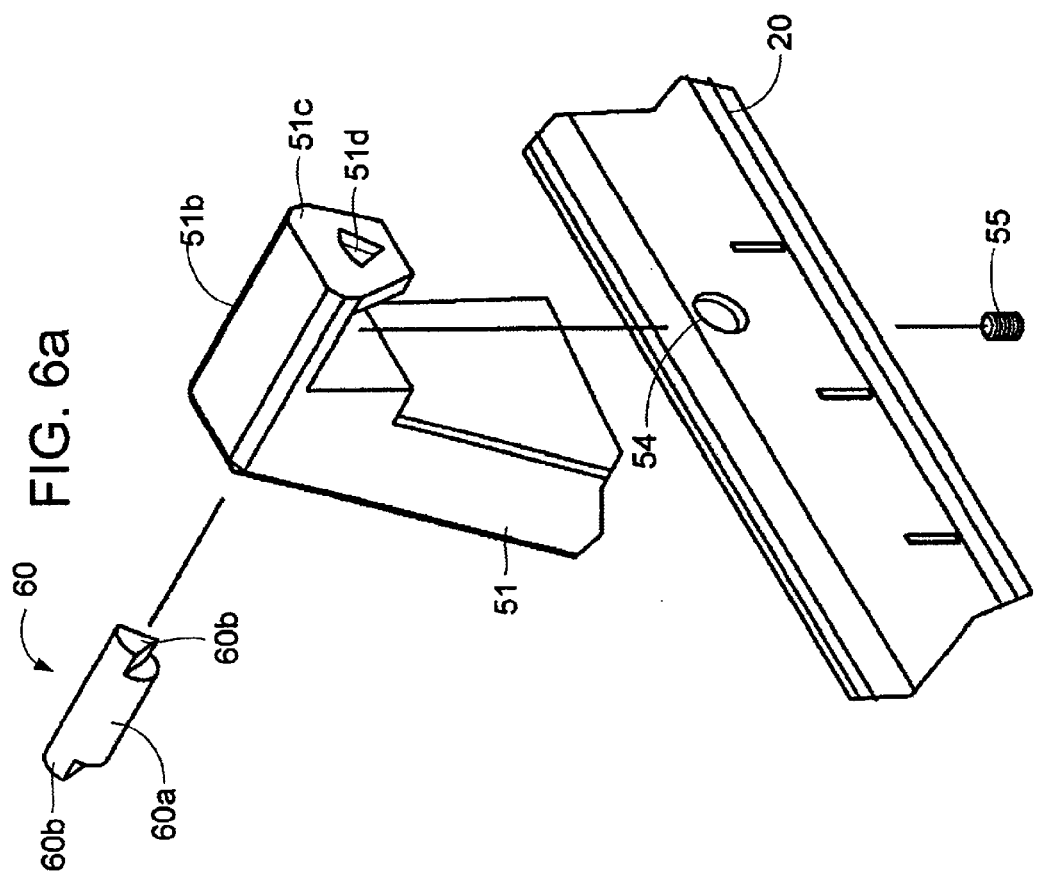

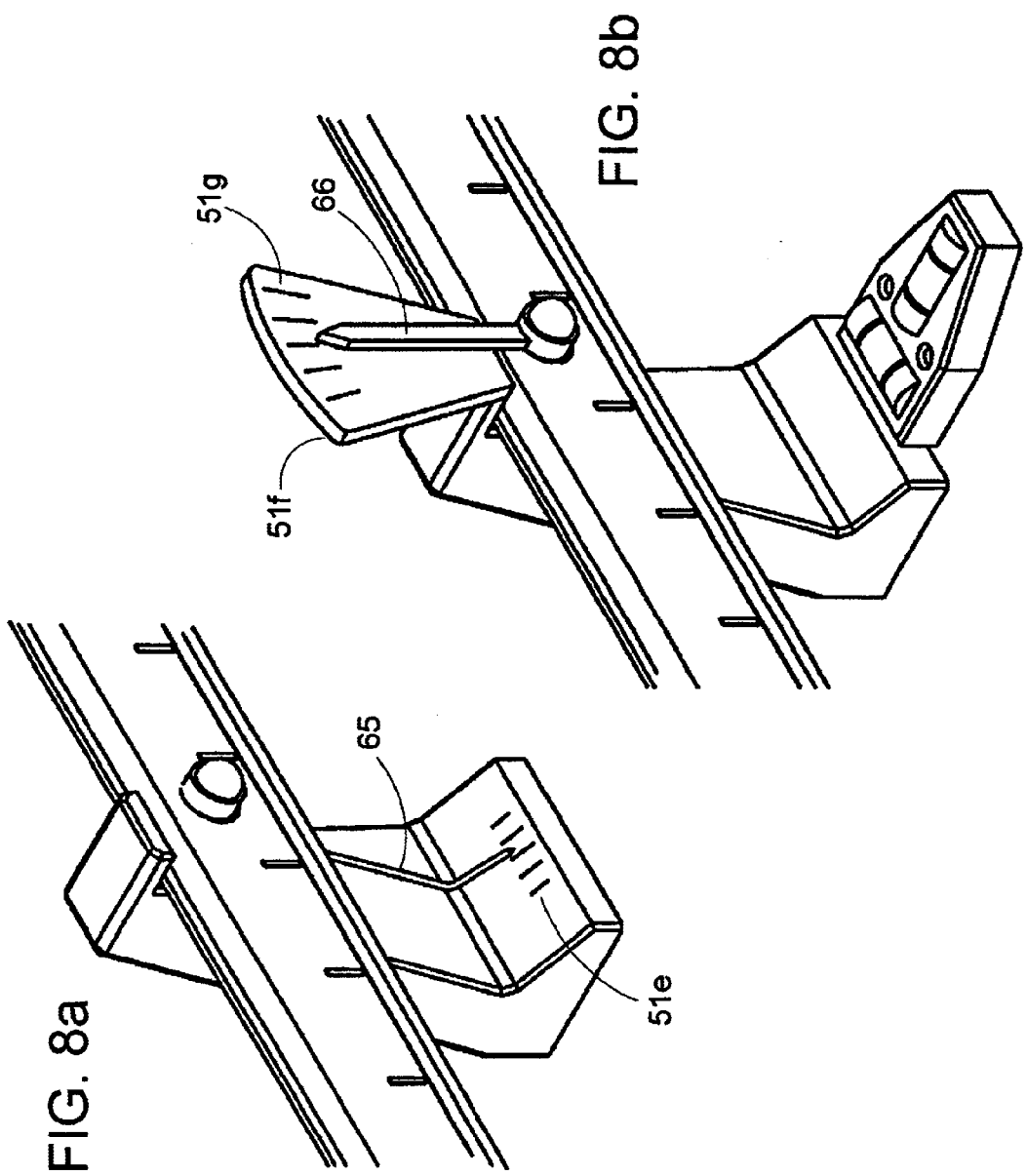

GOLF CLUB SWING WEIGHT BALANCE AND SCALE

TECHNICAL FIELD

This invention relates to devices for measuring the weights of objects as well as for measuring the first moment of objects about a fixed fulcrum point and, more particularly, to a device for measuring the total weight, swing weight, and weight of components of a golf club.

BACKGROUND OF THE INVENTION

The game of golf is extremely popular throughout the entire world, and both the amateur and the professional golfer seek every refinement and advantage possible. A set of golf clubs includes numerous attributes which may be adjusted, such as golf club length, golf club weight, shaft weight and flex, grip size, weight and texture, club head size, weight, shape, lie and loft angle, etc. All of these factors are known to affect the golf club mass distribution, its moment of inertia, feel, and level of playability.

The mass distribution, moment of inertia, and "feel" of a golf club are usually defined by a single attribute, referred to in the trade as swing weight. Swing weight is the first moment or couple of the golf club and is the product of the distance from the grip cap of the golf club (the extreme end opposite the club head) to a fixed fulcrum point, usually fourteen or twelve inches away from the grip cap. Swing weight is the amount of counterbalancing weight needed to counteract that moment in order for the golf club to balance on the fulcrum point. For example, a golf club having most of its mass concentrated toward the club head will have a higher swing weight than a golf club having most of its mass concentrated toward the upper end of the shaft and grip.

Just as the most desirable weight of a golf club will fall within a maximum and minimum limit and will vary according to the specific need of the golfer using the club, so will the swing weight vary between a maximum and a minimum limit and will vary according to the specific preferences of the golfer using the clubs. For example, a golf club having more of the mass concentrated toward the grip will have a relatively lower moment of inertia in the swing, and thus will impart less driving force to the ball, while a golf club having more mass concentrated toward the club head will have a higher moment of inertia which may make the club more difficult to swing with sufficient velocity for optimum driving distance. Thus, there is an optimum swing weight for every golfer. Moreover, swing weights should preferably be matched in a set of golf clubs so the golfer need not change his or her swing for different clubs having different swing weights.

Accordingly, golf club manufacturers attempt to measure and adjust the swing weights of their sets of golf clubs precisely in order to match the swing weights of each of the golf clubs as closely as possible. However, swing weight adjustment is a tedious and time consuming operation. Each time the swing weight is adjusted, each component of a golf club set must first be weighed in order to match the weights as closely as possible to the desired total weight and swing weight range. Then, the components must be assembled to build the new golf club. The assembled golf club must be weighed again, the swing weight measured and, if necessary, adjusted to the final desired swing weight and the total weight specifications by adding or removing weights, when possible, to the various components, such as the shaft grip and head.

Scales and balances used for measuring golf club weight and swing weight are typically unequal arm mechanical units, using a relatively small balance weight, i.e., counterpoise, adjusted along a relatively long arm from a pivot at a fulcrum point, to provide sufficient moment to counterbalance the weight of the golf club component being weighed on a relatively short arm from the fulcrum point. Devices of this type having sufficient accuracy typically have a relatively long counterpoise arm, resulting in a relatively fast oscillation period and poor damping characteristics. The delay in balancing due to the oscillation makes balancing a golf club rapidly and efficiently very difficult. However, reducing the length of the counterpoise arm to reduce the relatively long oscillation time and amplitude adversely affects the accuracy of the balancing instrument. Furthermore, it is usually difficult to determine with certainty when the scale has reached a position of equilibrium. Usually, the level, i.e., balance, indicator is at one end of the balance, a considerable distance from the fulcrum point. Finally, the fulcrum point is usually supported at the front and rear of the arm of the balance. This structure makes sliding of the counterpoise past the fulcrum point in a single motion impossible. In addition, reading of the indicia on the arm at or near the fulcrum point is difficult, if not impossible.

The present invention provides for ameliorating these disadvantages of the prior art. The advantages of the present invention will be apparent from the description as set forth below.

SUMMARY OF THE INVENTION

A golf club swing weight balance and scale according to the invention includes a weighing beam having and extending between first and second ends, a grip backstop disposed at the second end of the weighing beam and including a grip cap compensator movable within the grip backstop between an extended position and a retracted position, a slide weight slideably mounted on the weighing beam, and a pivot assembly pivotally supporting the weighing beam at a location intermediate the first and second ends and including a single support member disposed on only one side of the weighing beam so that the slide weight can be moved from the first end to the second end in a single stroke.

In a golf club swing weight balance and scale according to the invention, the pivot assembly preferably comprises a knife edge fulcrum having first and second ends, one of the ends including a knife edge pivotally connected to the weighing beam.

The single support member preferably includes a stop arm extending across the weighing beam and limiting amplitude of oscillation of the weighing beam.

In a preferred golf club swing weight balance and scale according to the invention, the slide weight indicator includes a balance indicator indicating when the weighing beam is balanced. Most preferably, the balance indicator is a bubble level mounted on the slide weight.

The grip cap compensator includes a head having a shape for engaging and supporting a grip end of a golf club shaft on which no grip is present. The head of the grip cap compensator is substantially co-planar with a grip contact surface of the grip backstop when the grip cap compensator is in the retracted position, so that a grip of a golf club may be placed in contact with the grip contact surface during a swing weight measurement. The head of the grip cap compensator protrudes from the grip cap contact surface of the grip backstop by a distance substantially equal to the thickness of an end of a golf club grip when the grip cap compensator is in the extended position so that the swing weight of a gripless golf club can be accurately determined.

The present invention provides several advantages over other golf club scales. The golf club scale in accordance with the present invention advantageously allows the swing weight and total weight of fully assembled and partially assembled golf clubs to be determined accurately using a single scale. The simplified design and minimal number of components advantageously reduces the cost associated with manufacturing the scale. The swing weight and total weight of a golf club can also be accurately determined prior to the final assembly of a golf club, e.g., present invention allows the swing weight and total weight of a golf club and/or golf club components to be determined more quickly and accurately than other scales. The point at which the weighing beam has reached equilibrium, e.g., is balanced, can be verified more quickly and more accurately than with prior art balances. The present golf club scale also allows total weight and swing weight readings to be made easily and accurately in all regions of the scale because the fulcrum point support does not obscure any part of the weighing beam indicia. Further, the support of the weighing beam permits movement of the counterpoise along the entire length of the weighing beam since the support does not obstruct the movement of the counterpoise at any point along the weighing beam.

BRIEF DESCRIPTION OF THE DRAWINGS

FIG. 5 is an exploded view of an embodiment of a pivot assembly according to the present invention.

FIG. 6a is an exploded view of another pivot assembly according to the present invention and FIG. 6b is a partially cut away view of the pivot assembly of FIG. 6a.

FIGS. 8a and 8b are detail views showing alternative balance indicator structures according to the present invention.

DETAILED DESCRIPTION

The present invention is directed to a golf club swing weight balance and scale, particularly to a balance and scale for determining the total weight and swing weight of fully assembled and partially assembled golf clubs.

Figure 1:
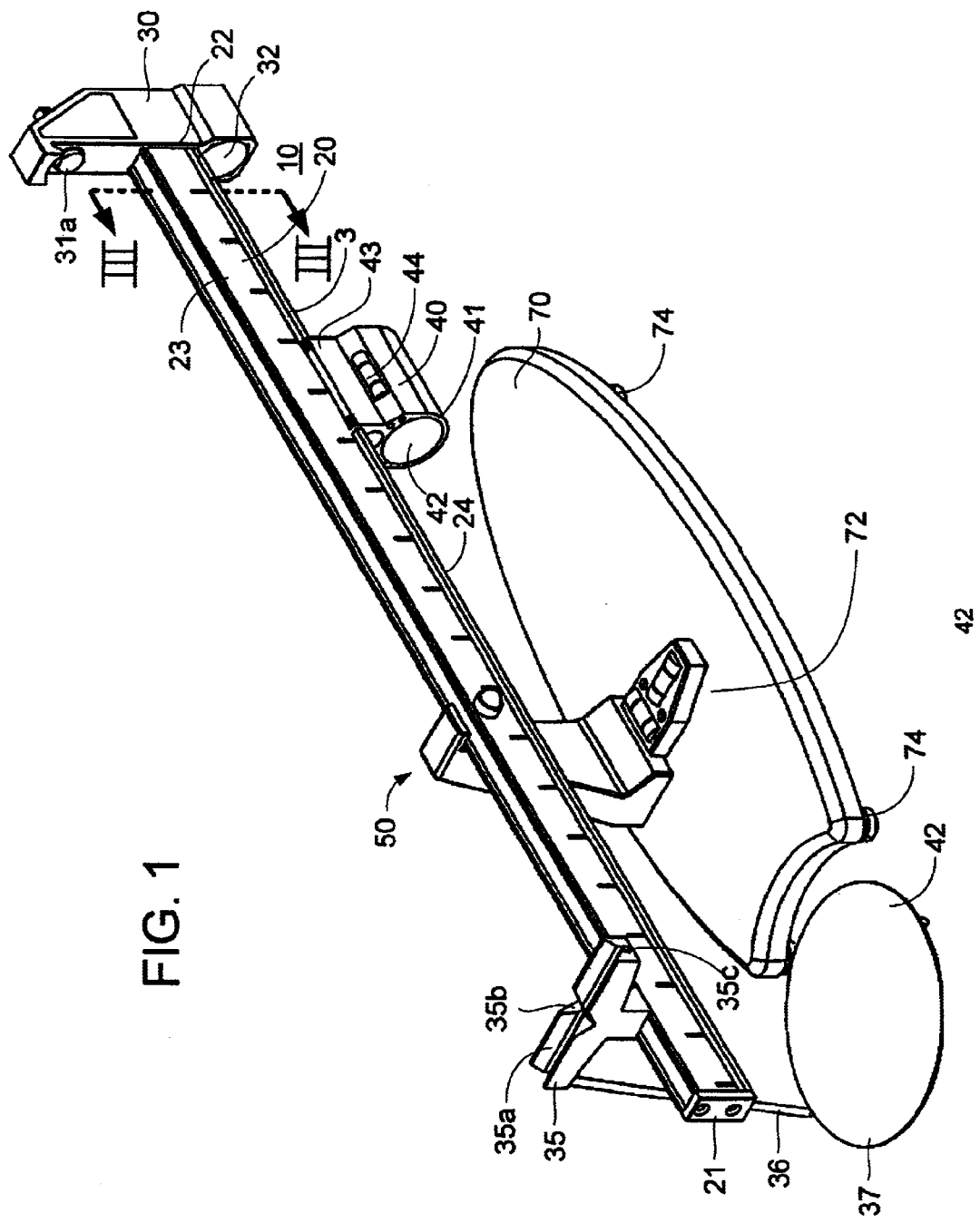
FIG. 1 is a perspective view of a golf club balance and scale in accordance with the present invention.
Figure 2:
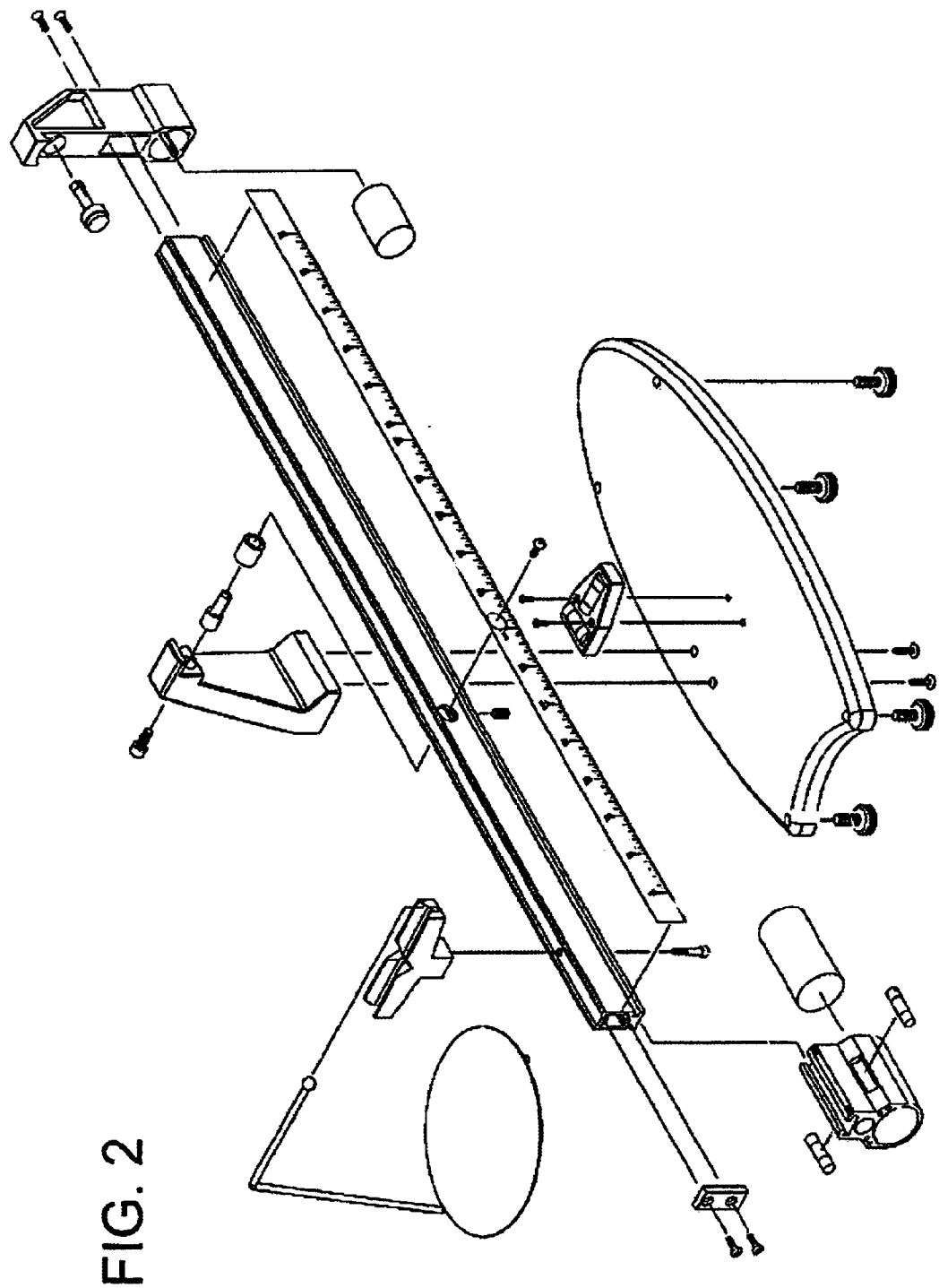
FIG. 2 is an exploded view of the golf club balance and scale of FIG. 1.

An embodiment of a golf club balance and scale 10 according to the present invention is illustrated in a perspective view in FIG. 1 and an exploded view in FIG. 2. FIG. 2 is free of reference numbers for clarity. However, throughout all figures the same reference numbers are used to identify like elements. As shown in FIG. 1, the golf club scale 10 includes a weighing beam 20 pivotally supported by a pivot assembly 50 at a fulcrum point, a slide weight 40 sliding along and engaging the weighing beam 20 for balancing the weighing beam 20 on the pivot assembly 50, and a base 70 on which the pivot assembly 50 is mounted. The base 70 preferably includes a level indicator 72 including two bubble levels arranged perpendicular to each other and a plurality of leveling screws 74.

Figure 3:
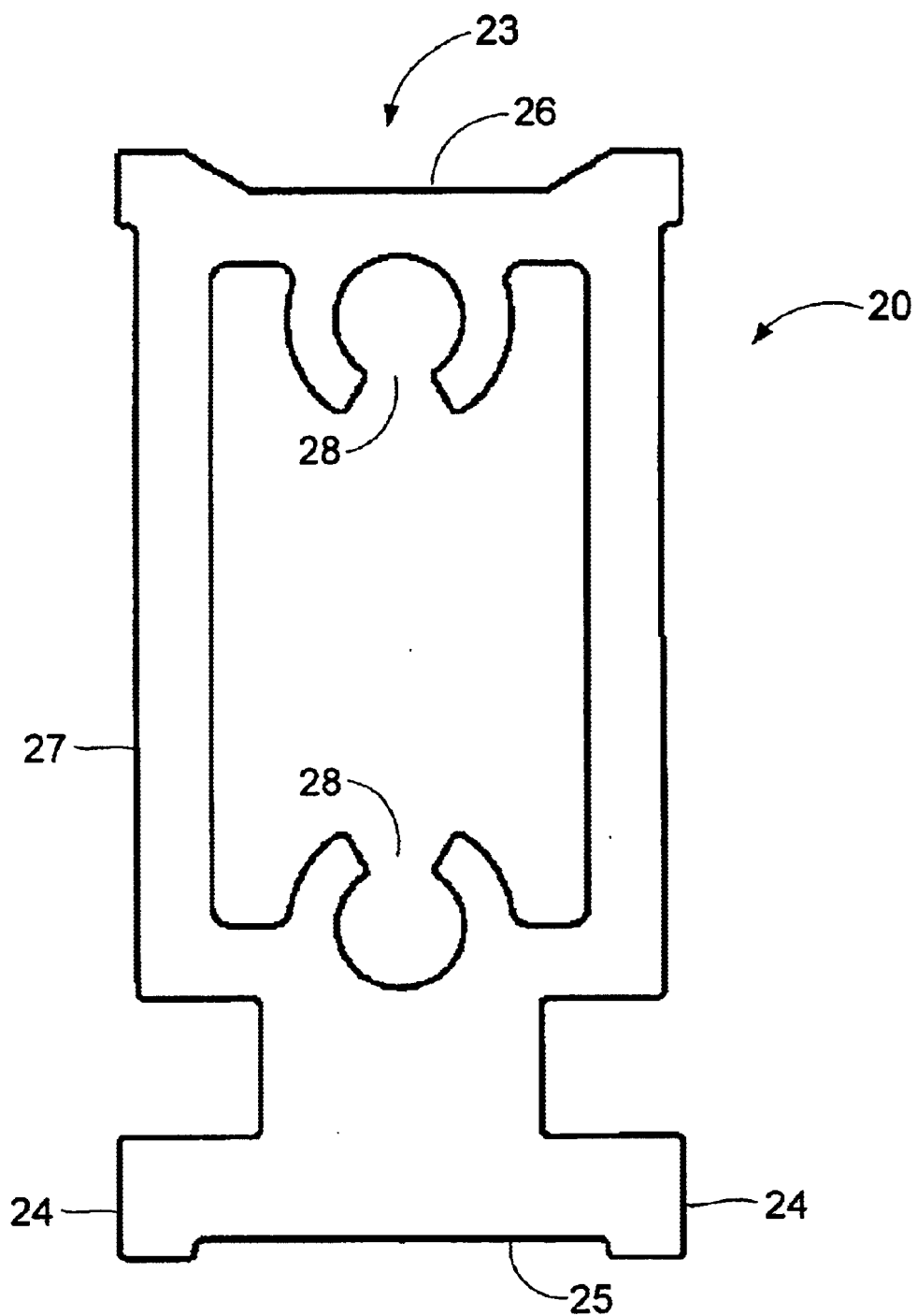
FIG. 3 is a cross-sectional view of the weighing beam of the scale and balance of FIG. 1.

The weighing beam 20 is preferably a unitary extruded hollow element having a generally rectangular cross-section. In a preferred embodiment, first and second ends 21 and 22 are attached to opposite ends of the weighing beam. The weighing beam includes, preferably as integral parts, a top 23, and flanges 24 extending outwardly from opposite sides of the weighing beam 20 at a bottom surface 25 (see FIG. 3) of the weighing beam. The top and bottom surfaces and the flanges extend between the first and second ends 21 and 22. FIG. 3 is a cross-sectional view of the weighing beam 20. The weighing beam top surface 23 preferably includes a valley 26 extending the length of the top surface 23 for retaining a golf club grip when swing balance of a gripless golf club is being determined, as described below. As shown more clearly in FIG. 3, the valley 26 extends the length of the weighing beam. The valley configuration advantageously allows a golf club grip to be maintained in position without the use of any additional restraining member, e.g., tape, as described below, so the grip is included in the swing weight measurement of the gripless golf club. The flanges 24 provide a slide weight guide track, extending the full length of the weighing beam 20, that supports the sliding weight 40 so the weight can slide along the entire length of the weighing beam 20. In the illustrated embodiment, as best seen in FIG. 3, the guide track has an inverted T-shape, although the guide track may have any suitable configuration for slidably engaging the slide weight 40, such as a slot, a groove, or a channel. The hollow central part of the weighing beam may include partially cylindrical elements for attachment of the ends 21 and 22, as illustrated in FIGS. 2 and 3.

The weighing beam 20 also includes a front surface 27 extending from the top surface 23 toward the bottom surface 25 and between the first 21 and second 22 ends of the weighing beam. Measurement indicia are present on the front surface 27 of the weighing beam and may be grooves cut into the front surface, a separately prepared tape adhered to the weighing beam, or markings applied by silk screening or another application technique, or decals. These measurement indicia provide reference points for use in a weight measurement and in measuring swing weight balance of items placed on the weighing beam 20 or in a weighing tray described below. When the weight of the counterpoise 40 is established, for a particular scale, the indicia may directly indicate the weight of an article placed on the weighing tray.

Figure 4A:
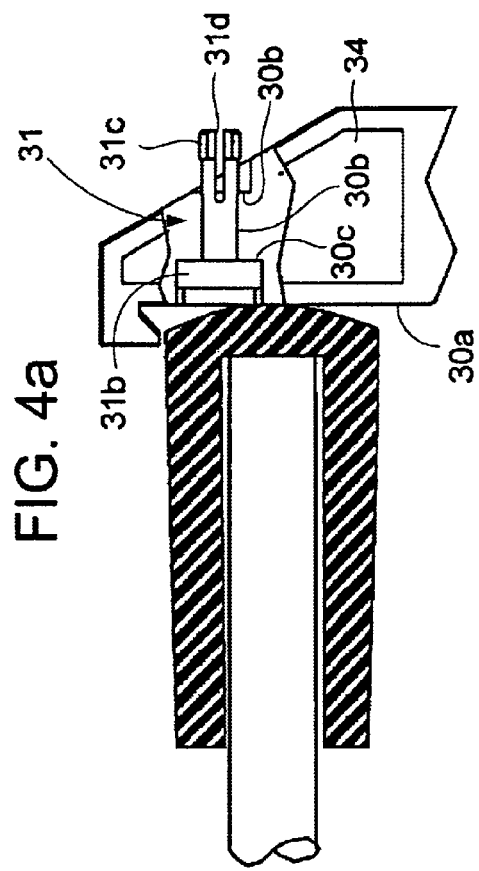
FIGS. 4a and 4b are partially cut away side views of embodiments of a grip backstop of a golf club balance and scale in accordance with the present invention.
Figure 4B:
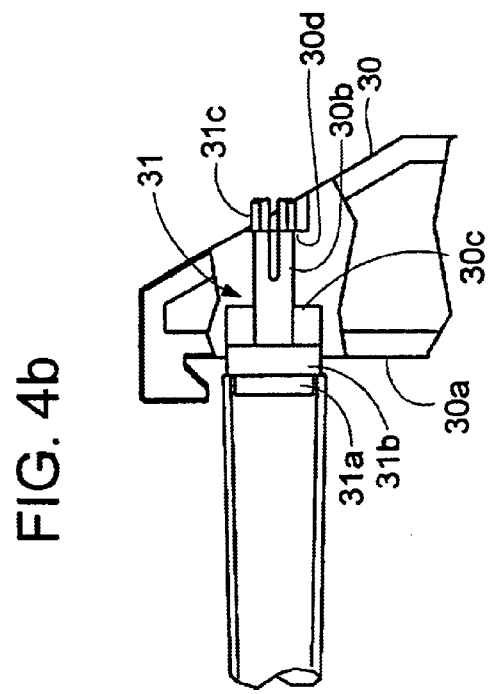

A grip backstop 30 is preferably disposed at the second lengthwise end 22 of the weighing beam. The grip backstop 30 may have any suitable configuration providing a surface 31a, which is planar in the illustrated embodiment, against which an end of a club grip may be placed in the course of a swing weight measurement. In FIGS. 4a and 4b, the grip backstop 30 is shown partially in section to illustrate a grip cap compensator 31 slidably mounted within the grip backstop 30. The grip cap compensator is movable between a retracted position in FIG. 4a and an extended position in FIG. 4b. For clarity, the weighing beam 20 is omitted from FIGS. 4a and 4b. The grip cap compensator 31 does not project outwardly from the surface 31a of the grip backstop 30 in the retracted position. In the extended position, the grip cap compensator 31 extends outwardly from the surface 31a of the grip backstop 30 by a distance essentially equal to the average thickness of the end of a golf club grip.

Figure 7A:
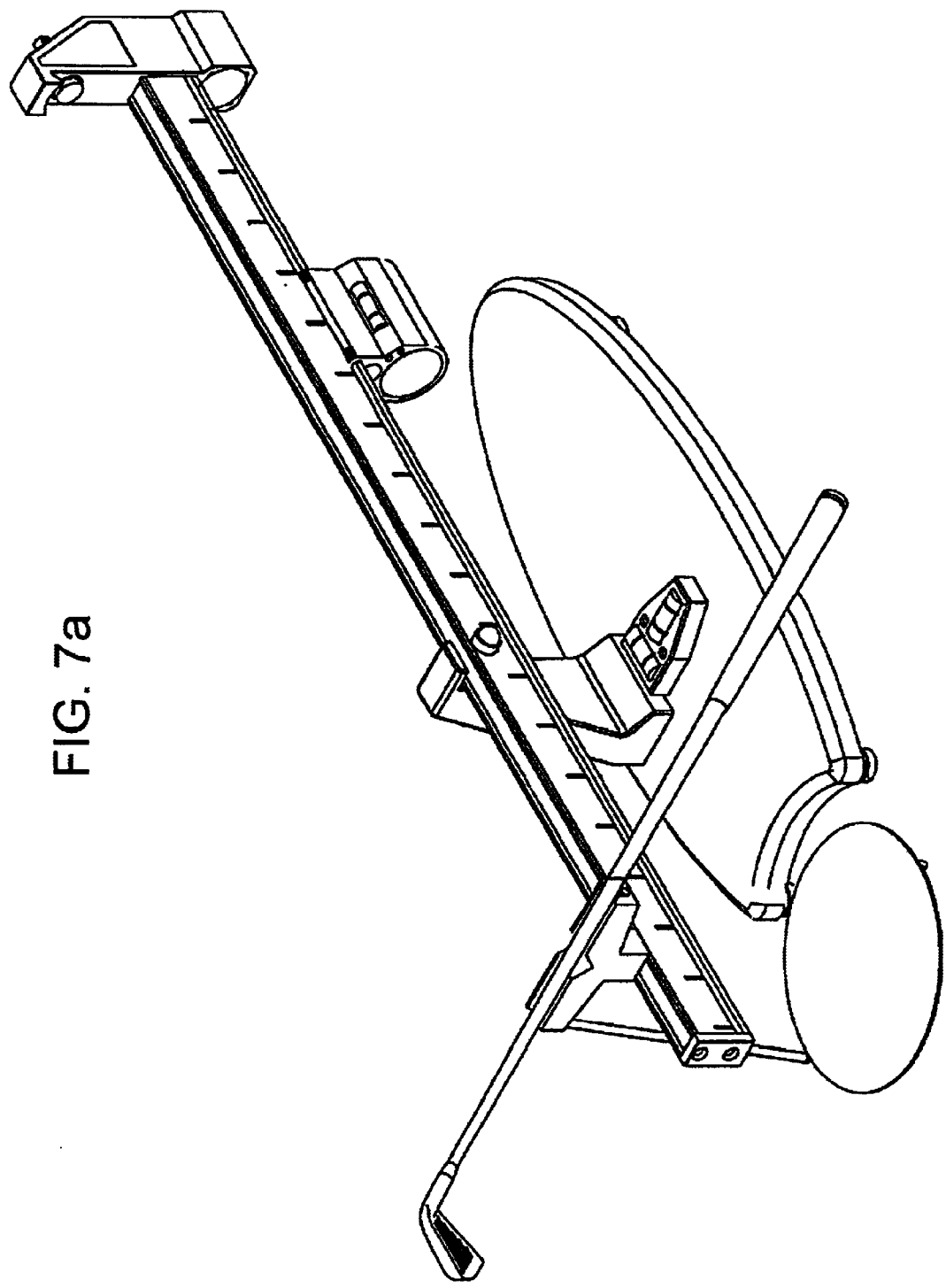
FIGS. 7a, 7b, 7c, and 7d illustrate use of a golf club balance and scale in accordance with the present invention.
Figure 7B:
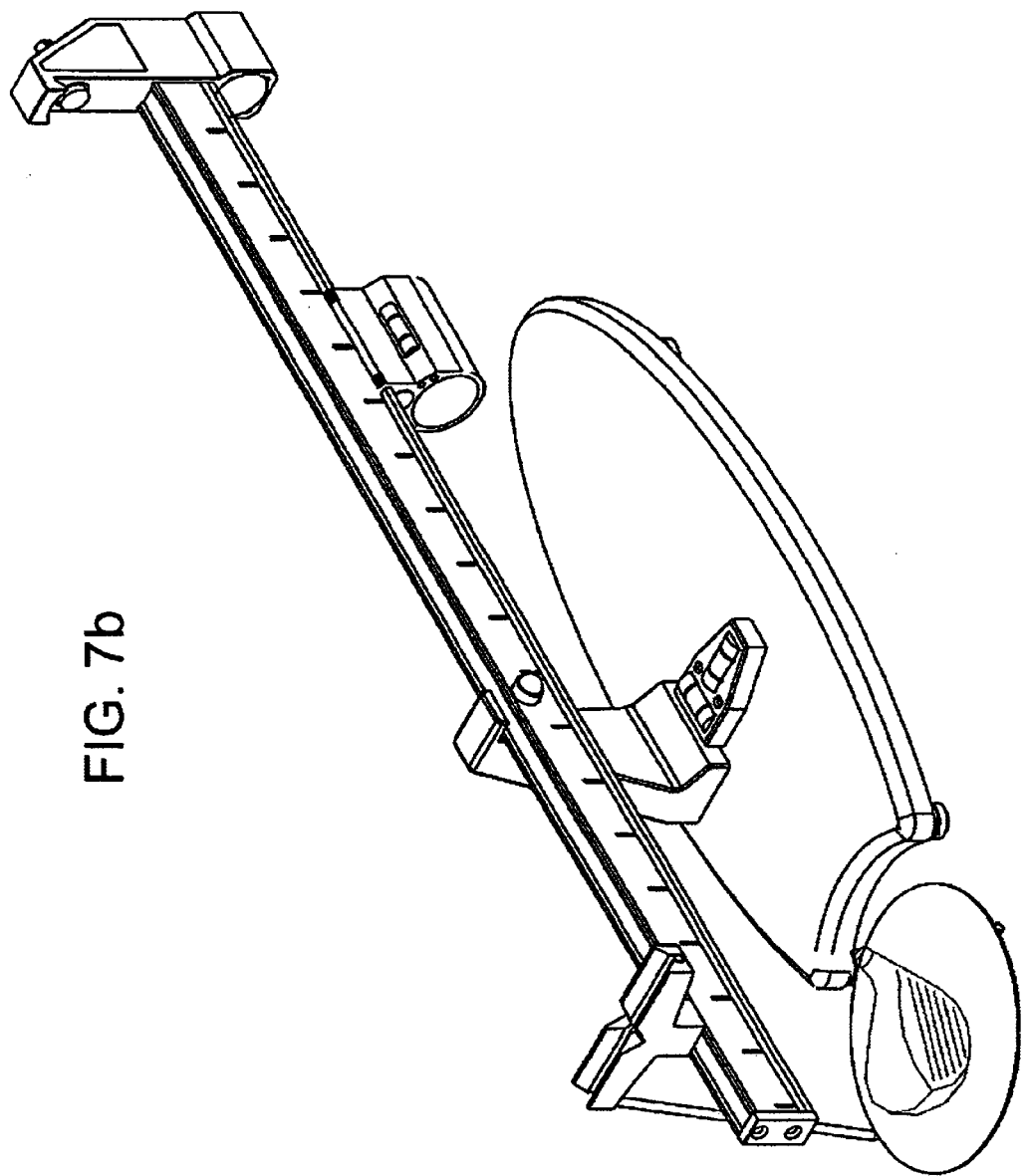

One end of the grip cap compensator 31 has a head including an internal golf club shaft support 31a and a concentric collar 31b. The internal golf club shaft support 31a is preferably circular in shape and has an outside diameter sized to fit within and provide temporary retention and support of the shaft of a gripless golf club, with the end of the shaft butted against the collar 31b, as shown in FIG. 4b. (The shape of the golf club shaft support need not be circular and can be any shape that provides sufficient secure support for the shaft without undue difficulty in attaching and detaching the golf club shaft.) The golf club shaft without a grip is supported at the grip end with the cap compensator 31 in the extended position. The grip can then be placed in the valley 26 of the weighing beam 20 (as shown in FIG. 7d) during a swing balance determination. When a golf club having a grip already installed on the shaft is being balanced, the grip cap compensator 31 is moved to the retracted position shown in FIG. 4a. Then, when swing weight balance is determined, the end of the grip is positioned against the surface 30a of the backstop 30, adjacent the grip cap compensator 31.

The grip cap compensator slides within a hole 30b in the backstop 30, generally parallel to the weighing beam 20, and is restrained in sliding directions by surfaces 30c and 30d of the backstop 30. The collar 31b of the head bears against the surface 30c when the grip cap compensator 31 is in the retracted position. The surface 30c is positioned relative to the surface 30a of the backstop so that when the collar 31b is in contact with the surface 30c, the front surface of the golf club shaft support 31a does not protrude relative to the surface 30a and, preferably, is flush with that surface 30a. The grip cap compensator 31 has a longitundinally ridged split distal end 31c that includes a groove 31d generally parallel to the weighing beam 20. The split end permits the grip cap compensator to be inserted into the hole 30b in the backstop 30 during manufacture. Then, the parts of the end separated by the groove 31d are displaced slightly outwardly to retain the grip cap compensator 31 in the backstop 30 while permitting the compensator to slide within the hole 30b in the backstop. The ridged portion at the end of the compensator bears against a surface 30d in the backstop 30 when the compensator is in the extended position shown in FIG. 4b. The backstop 30 also preferably includes a weight 32, retained in a complementary holster in the backstop, at the underside of the weighing beam 20. The weight 32 counterbalances the elements of the balance and scale mounted on the weighing beam 20 between the fulcrum point and the first lengthwise end 21 of the weighing beam 20.

Swing weight is generally defined as the moment required to balance a golf club at a point either fourteen inches or twelve inches (depending on the system used) from the extreme end of the grip. The grip backstop 30 is therefore preferably located either fourteen inches or twelve inches (depending on the system used) from the fulcrum point, e.g., the point at which the weighing beam 20 is pivotally supported by the pivot assembly 50.

In operation, a golf club including a grip, placed on the weighing beam with the end of the grip abutting the surface 30a of the grip backstop 30, will have a point fourteen inches (or 12 inches in some embodiments) from the end of the grip, positioned on the weighing beam 20 at the fulcrum point. The grip of a golf club has a thickness, and, therefore, the point fourteen inches from the end of the grip is not the same as the point located fourteen inches from the end of the shaft when there is no grip on the golf club shaft and the end of the shaft is in contact with the surface 30a of the backstop 30. If the end of the shaft of a gripless golf club were placed against the surface 30a of the backstop 30, the swing weight would be measured about a point different from the point at which the swing weight would be measured if the grip were present on the shaft. The grip cap compensator 31 solves this problem. As seen in FIG. 4a, when the grip cap compensator 31 is in the extended position, supporting a gripless golf club shaft, it compensates for the thickness of end of the missing golf club grip. To achieve that result, the portion of the head of the grip compensator protrudes from the backstop 30, relative to the surface 30a, by an amount equal to the average thickness of the end of a golf club grip. This distance is equal to the distance between the ridge end 31c of the compensator 31 and the surface 30d of the backstop 30 when the compensator is in the retracted position shown in FIG. 4a. Thus, the swing weight is measured about the same point for a gripless and gripped golf club.

A golf club weighing support element 35 is preferably fixed attached to the weighing beam 20 at a point between the fulcrum point and the first lengthwise end 21 of the weighing beam 20. The golf club weighing support element 35 preferably includes a recess 35a, generally transverse to the weighing beam 20, for supporting a golf club perpendicular to the weighing beam 20 for weighing the golf club. Preferably, the golf club weighing support element 35 also includes a pair of retaining notches 35b, generally parallel to the weighing beam 20, for supporting a portion of the golf club shaft when the golf club is placed parallel to the weighing beam 20 in making swing weight measurements. A support rod 36 has one end inserted into a complementary retaining groove at the bottom of and parallel to the recess 35a of the golf club weighing support element 35. The rod supports a component weighing tray 37 that hangs below the golf club weighing support element 35. The component tray 37 may have any suitable configuration for holding various golf club components such as club heads, grips, and other parts used in making golf clubs.

The pivot assembly 50 is a particularly important part of the swing weight balance and scale. Its construction affects the accuracy and speed of balancing the scale. Moreover, its support structure directly affects the ability to read the balance accurately regardless of the location of the slide weight 40. Therefore, several preferred embodiments of pivot assemblies are described.

As illustrated in FIG. 5, one embodiment of the pivot assembly 50 comprises a single support member 51 disposed adjacent the back surface of the weighing beam 20. The support member 51 in all described embodiments is not perpendicular to the base 70 of the balance and scale but tilts forward, toward the user, i.e., a person in a position to read the indicia on the front surface 27 of the weighing beam 20. Utilizing a single support member 51 positioned behind, e.g., adjacent the back surface, of the weighing beam, and tilted forward provides unobstructed access to the measuring indicia on the front surface of the weighing beam 20 and to the slide weight 40 in the pivot assembly region. Accordingly, the slide weight may be moved in one uninterrupted stroke along the length of the weighing beam 20, and a clear and unobstructed view of the measuring indicia is provided. The support member 51 preferably includes a top including a stop arm 51b extending across the top surface of the weighing beam 20 and a bottom mounted to the base 70 as indicated in FIG. 2. The stop arm 51b preferably extends across the top surface of the weighing beam and may have any configuration for limiting the oscillation amplitude of the weighing beam relative to an equilibrium position.

In the pivot assembly embodiment 50 shown in an exploded view in FIG. 5, a knife-edge fulcrum 52 includes a cylindrical part 52a and a knife edge part 52b. The cylindrical part is received in a recess 51a in the support member 51, which has a shape complementary to the shape of the cylindrical part. A fastener, such as machine screw 53, passes through the opposite side of the support member 51 from the recess 51a and engages the cylindrical part 52a, holding the knife-edge fulcrum in the support member. The knife edge part 52b includes a relatively sharp edge formed by two intersecting external surfaces and extending transverse to the weighing beam 20 and an internal hole for receiving and engaging a fastener, such as a machine screw.

A bearing 53 slides over the knife edge part 52b and includes a pair of internal planar surfaces intersecting at an angle larger than the angle formed by the corresponding surfaces of the knife edge part 52b. Together, these pairs of internal and external surfaces form the knife edge for balancing of the weighing beam 20. The bearing 53 passes snugly through a hole 54 in the weighing beam 20, transverse to the length of the weighing beam. The bearing 53 is fixedly connected to the weighing beam 20 by a set screw 55 or another fastener oriented in a direction generally perpendicular to the base 70. The assembly of the weighing beam 20 and the bearing 53 are held on the knife edge part 52b of the fulcrum 52 by a machine screw 56 or other fastener. Thus, the only moving part in balancing the weighing beam 20 is the bearing 53 and the parts fixed to it, namely the weighing beam 20. In this embodiment, the bearing 53 extends the full length of the knife-edge fulcrum. Thus, the bearing advantageously eliminates any asymmetrical load bearing on the pivot pin as in known scales, particularly those scales and balances utilizing two pivot support members.

Figure 6B:
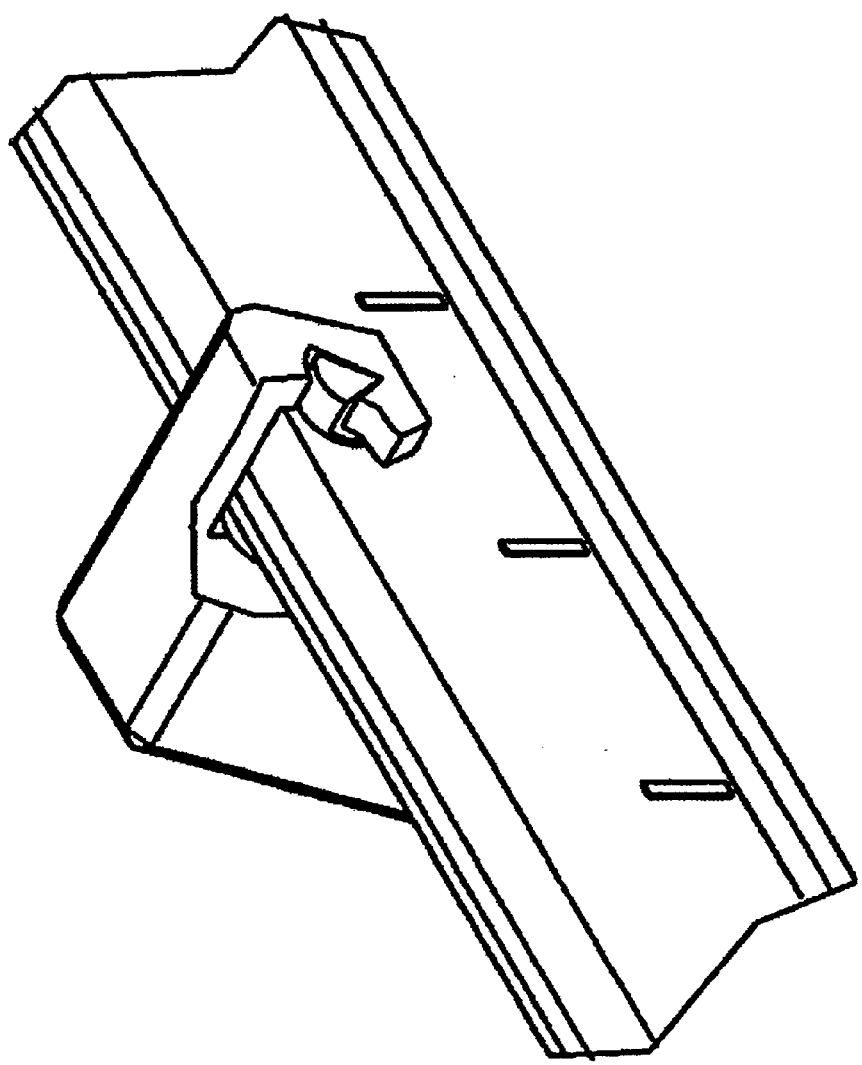

An alternative pivot assembly 50 is illustrated in FIG. 6a and in a partially cut away detail view in FIG. 6b. The parts not described with regard to FIGS. 6a and 6b are identical to the corresponding parts shown and described with respect to FIG. 5. In this embodiment, the knife edge fulcrum 60 includes a central cylindrical portion 60a and knife edge portions 60b on opposite sides of the cylindrical portion 60a and at the ends of the knife edge fulcrum. The weighing beam 20 includes the hole 54. In this embodiment, the cylindrical part 60a of the knife edge fulcrum passes through the hole 54. The set screw 54 bears against the central cylindrical part of the knife edge fulcrum, fixing the knife edge fulcrum in place with respect to the weighing beam 20. The overhanging top 51b of the support member 51 includes a depending part 51c extending toward the base 70. The depending part 51c and a part of the support member 51 that is not visible in FIG. 6a, include openings having intersecting planar internal surfaces that support the respective knife edge parts 60b. As in the knife edge support structure embodiment of FIG. 5, the internal surfaces in the support 51 have a larger angle of intersection than do the external surfaces of the knife edge parts 60b, providing for the accurate balancing of the weighing beam 20. This support arrangement is shown more clearly in the partially cut away detail view of FIG. 6b. In both support structures the internal surfaces of the knife edge structures also assist in limiting the amplitude of oscillation of the weighing beam 20 during a; weighing or swing weight balancing procedure.

A slide weight 40 has a mass chosen to counterbalance the moment of a golf club and the weight of club components throughout the usual weight and swing weight measuring ranges. Measurements may be made in centimeter-grams or inch-ounces, depending upon the unit system in local use, as is customary in the trade. The slide weight 40 is slideably mounted on the slide weight guide track comprising the flanges 24 of the weighing beam 20. The slide weight 40 may be connected to the guide track in any suitable manner, allowing the slide weight 40 to move freely along the entire length of the measuring beam. In the embodiment illustrated in FIGS. 1 and 2, the slide weight 40 preferably includes a cylindrical slide weight holder 41 into which a mass or weight 42 is inserted. The slide weight holder 41 also includes a guide element 43 cooperating with the slide weight guide track, i.e., flanges 24.

The slide weight holder 41 also includes one, and preferably two, bubble level indicator 44, as shown in FIGS. 1 and 2, for indicating when the measuring beam is level and has reached equilibrium. This indication is given locally, i.e., at the position of the slide weight, without the necessity of having to consult the position of the end of the weighing beam 20, as in prior art balances. Therefore, the balancing can be quickly achieved while focusing on the slide weight position and the bubble indicators. In addition, because of the structure of the support 50, both the slide weight moves freely at the fulcrum point and the indicia can be clearly read, even at the fulcrum point.

Although bubble level indicators mounted on the slide weight are preferred for determining balancing of the weighing beam 20 and are shown in FIGS. 1 and 2 and other figures, any level indicator that allows the equilibrium position of the beam to be determined may be used. Two alternatives are shown in FIGS. 8a and 8b. In FIG. 8a, the level indicator comprises a pendulum indicator and/or needle indicator 65 fixed to the weighing beam 20 and directed toward the base of the support member 51. That base includes indicia 51e for determining the balance or imbalance of the weighing beam 20. The needle indicator 65 is fixed to the weighing beam 20 between the support member 51 and the weighing beam 20 so that the slide weight 40 can still slide freely between the ends of the weighing beam in a single stroke without interference by or with the needle.

Yet another alternative indicator is shown in FIG. 8b and includes a wall 51f extending upwardly from the top 51b of the support member 51. Balance indicia 51g are present on the wall 51f. An upwardly pointing needle 66 is fixedly attached to the weighing beam 20, for example at the bearing 53 and indicates the balance or imbalance of the weighing beam 20 by reference to the indicia 51g. Since this balance indicator is not near the slide weight it cannot interfere with the slide weight movement. Regardless of the balance indicator employed, the determination that the weighing beam has reached equilibrium can be made with more certainty and greater accuracy with the balance and scale according to the invention than in previously known balances.

In operation, the golf club scale 10 may be used to determine the swing weight of a fully assembled golf club or a partially assembled golf club and to determine the weight of a fully assembled golf club, a partially assembled golf club and/or various golf club components. As shown in FIG. 7a, to measure the weight of an assembled golf club, the shaft of the club is placed in the recess 35a of the support element 35. The position of the slide weight 40 is adjusted to place the beam 20 in the horizontal, i.e., balanced or equilibrium, position. Of course, a partially assembled club including a shaft can be weighed in the same way. Components of a golf club, such as the club head, can be weighed by placement on the tray 37 and balancing the weighing beam by movement of the slide weight 40, as shown in FIG. 7b.

Figure 7C:
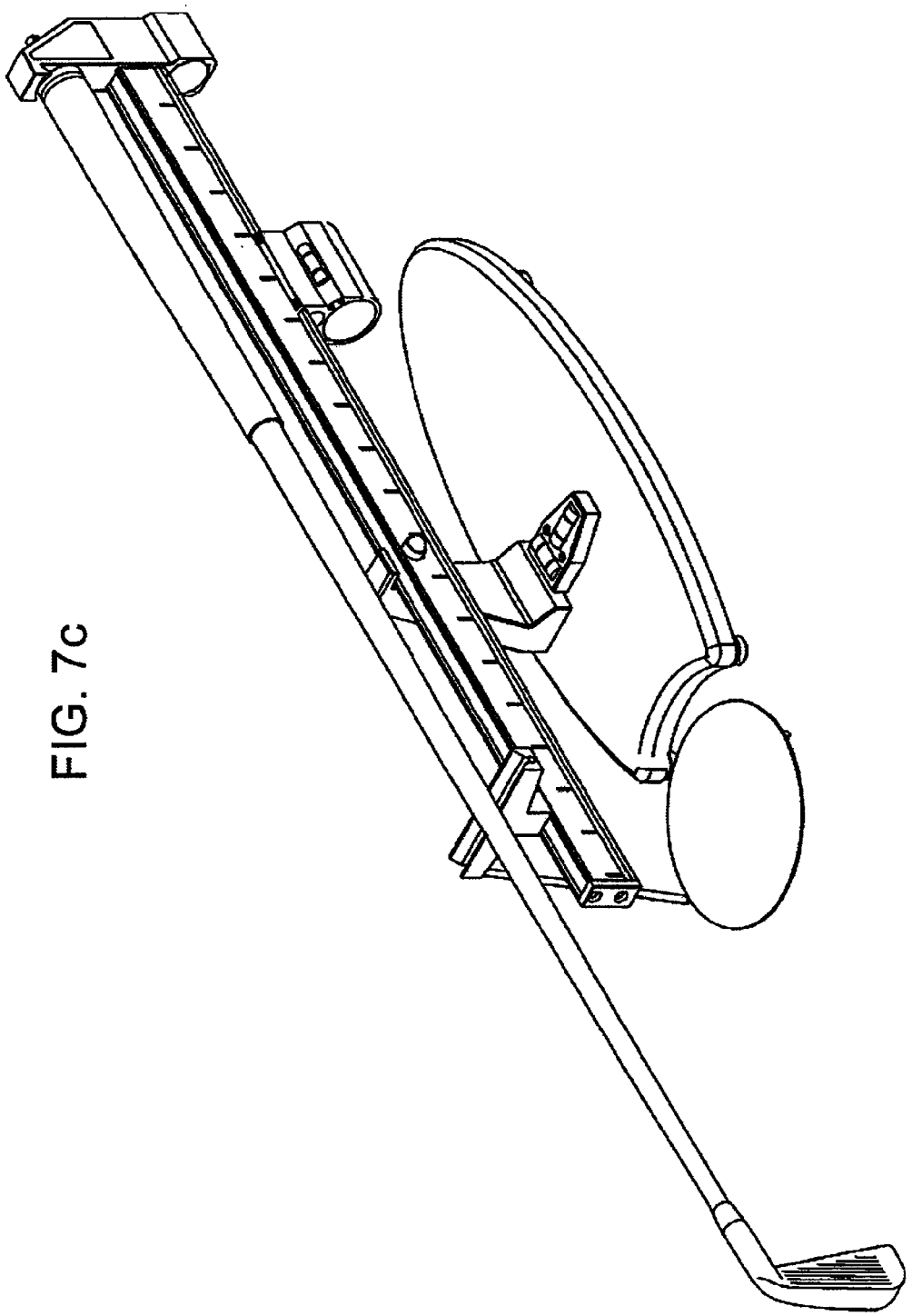
Figure 7D:
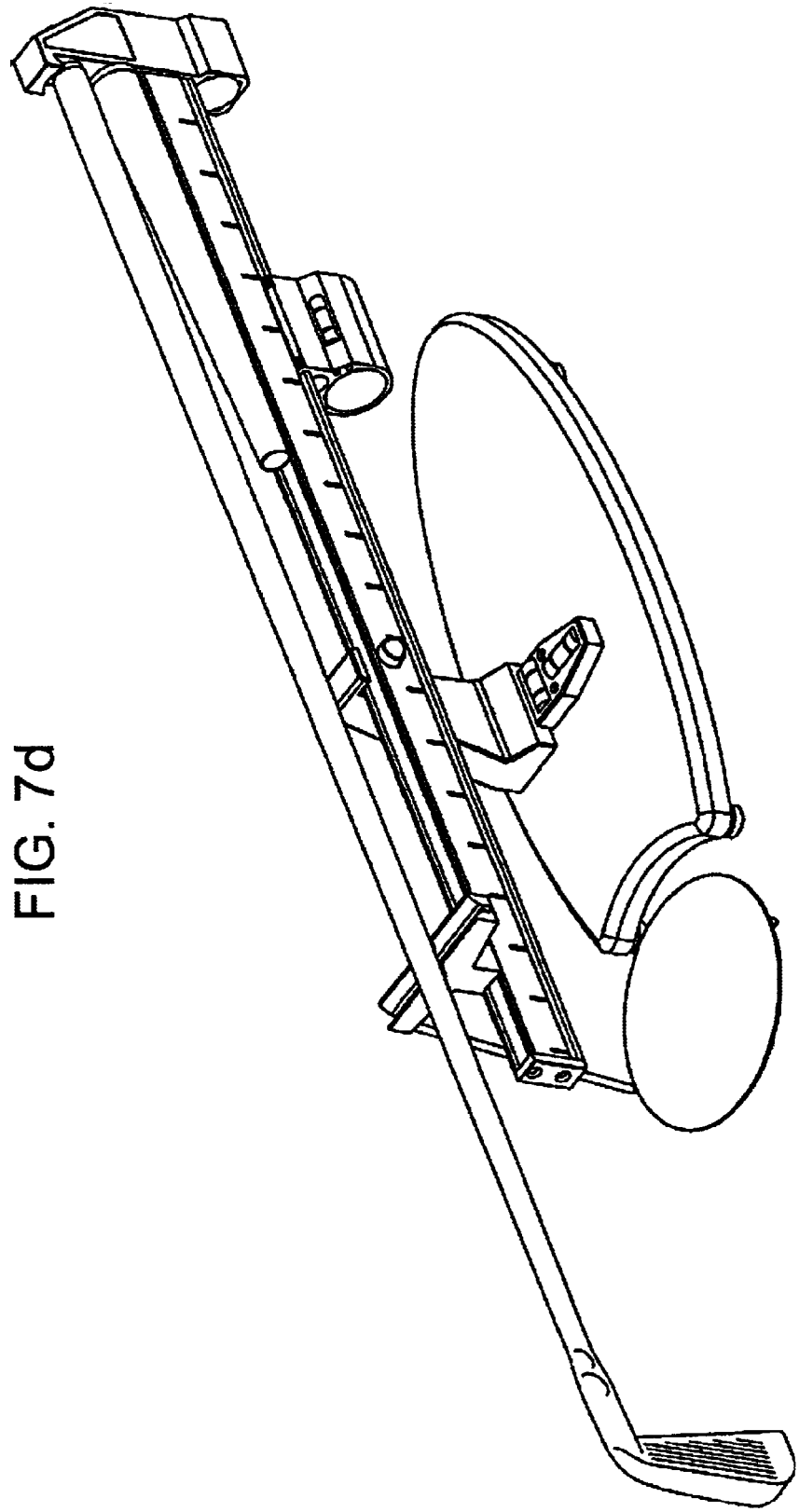

The swing weight of a fully assembled golf club may be determined by disposing the golf club on the golf club scale 10 with the golf club shaft oriented along the length of the weighing beam 20 with the golf club shaft placed in the pair of notches 35b of the golf club weighing support element 35, as shown in FIG. 7c. The golf club grip is disposed adjacent and in contact with the surface 30a of the grip backstop 30. In this process, the grip cap compensator 31 is in the retracted position.

As shown in FIG. 7d, when the same process is carried out for a golf club without a grip, the grip cap compensator 31 is placed in the extended position. The end of the shaft is placed over the the golf club shaft support element 31a of the head of the grip cap compensator 31 and the grip that will later be placed on the shaft is placed directly on the weighing beam 20, abutting the surface 30a of the backstop 31, so that the weight of the grip is considered in determining the swing weight. This procedure avoids estimates of swing weight and additional swing weight adjustments after the grip is installed.

Measuring the weight of a complete golf club prior to actually assembling all of the components provides a basis for an accurate swing weight measurement of the golf club. The measurement eliminates the estimation of the effect of the component on the final swing weight before final assembly of the golf club. Furthermore, measuring the swing weight of a golf club prior to attaching the grip simplifies the swing weight determination process and reduces the amount of time necessary to balance and produce a golf club. For example, in response to the measured swing weight of a golf club, weights may be added to the golf club shaft to alter the final swing weight and balance of the golf club so that it matches the swing weight of other clubs in a set of golf clubs. Accurately measuring the swing weight of the complete club prior to attaching the grip allows the weights to be easily added to the grip end without the difficult step of removing and replacing the grip between each measurement and weight adjustment.

At the beginning of any procedure using the balance and scale, the two-way level indicator 72 in the base 70 is checked to ensure the base 70 and scale 10 are level. If the two-way level indicator 72 shows the base 70 and scale 10 are not level, appropriate adjustments may be made using the leveling screws 74 in the base 70. Once the base 70 and scale 10 are level and the golf club, golf club component, or the like is placed on the balance and scale, the slide weight holder 40 is moved along the length of the weighing beam 20 until the weighing beam 20 is balanced on the knife-edge fulcrum, e.g., until equilibrium is reached with equal mass on each side of the fulcrum. The level indicators 44 on the slide weight holder 40 indicate whether equilibrium has been reached. The weight of the item being weighed or the swing weight of the golf club are read from the swing weight measuring indicia on the weighing beam 20 at the location of the swing weight 40.

Preferred embodiments of the invention have been described. Of course, variations of those preferred embodiments will become apparent to those of ordinary skill in the art upon reading the foregoing description. The inventor expects skilled artisans to employ variations, and the inventor intends the invention to be practiced otherwise than as specifically described here. Accordingly, this invention includes all modifications and equivalents of the subject matter recited in the claims.

What is claimed is:

1. A golf club swing weight balance and scale comprising:
    a weighing beam having and extending between first and second ends,
    a grip backstop disposed at the second end of the weighing beam and including a grip cap compensator movable within the grip backstop between an extended position and a retracted position;
    a slide weight slideably mounted on the weighing beam; and
    a pivot assembly pivotally supporting the weighing beam at a location intermediate the first and second ends and including a single support member disposed on only one side of the weighing beam so that the slide weight can be moved from the first end to the second end in a single stroke.

2. The golf club swing weight balance and scale according to claim 1 wherein the pivot assembly comprises a knife edge fulcrum having first and second ends, the first end being fixedly connected to the single support member and the second end including a knife edge pivotally connected to the weighing beam.

3. The golf club swing weight balance and scale according to claim 1 wherein the pivot assembly comprises a knife edge fulcrum pivotally connected to the weighing beam and having first and second ends, the first and second ends having knife edges and pivoting in the single support member.

4. The golf club swing weight balance and scale according to claim 3 wherein the single support member includes a stop arm extending across the weighing beam and limiting amplitude of oscillation of the weighing beam.

5. The golf club swing weight balance and scale according to claim 4 wherein the single support includes a wall depending from the stop arm and the second end of the knife edge fulcrum is supported in an opening in the wall.

6. The golf club swing weight balance and scale according to claim 1 wherein the single support member includes a stop arm extending across the weighing beam and limiting amplitude of oscillation of the weighing beam.

7. The golf club swing weight balance and scale according to claim 6 including a balance indicator comprising an upstanding wall extending from the stop arm and including balance indicia and a needle fixed to the pivot assembly and moving parallel to the upstanding wall opposite the balance indicia.

8. The golf club swing weight balance and scale according to claim 1 including a balance indicator comprising a needle fixed attached to the pivot assembly and extending along the single support member, wherein the single support assembly includes indicia opposite the needle for determining balance of the weighing beam.

9. The golf club swing weight balance and scale according to claim 8 wherein the needle is disposed between the weighing beam and the single support member.

10. The golf club swing weight balance and scale according to claim 1 wherein the slide weight indicator includes a balance indicator indicating when the weighing beam is balanced.

11. The golf club swing weight balance and scale according to claim 10 wherein the balance indicator is a bubble level.

12. The golf club swing weight balance and scale according to claim 1 wherein the grip cap compensator includes a head having a shape for engaging and supporting a grip end of a golf club shaft on which no grip is present.

13. The golf club swing weight balance and scale according to claim 12 wherein the head of the grip cap compensator is substantially co-planar with a grip contact surface of the grip backstop when the grip cap compensator is in the retracted position, a grip of a golf club being placed in contact with the grip contact surface during a swing weight measurement.

14. The golf club swing weight balance and scale according to claim 13 wherein the head of the grip cap compensator protrudes from the grip cap contact surface of the grip backstop by a distance substantially equal to the thickness of an end of a golf club grip when the grip cap compensator is in the extended position.

* * * * *